United States Patent
Yoshii et al.

(10) Patent No.: US 6,863,410 B2
(45) Date of Patent: Mar. 8, 2005

(54) REFLECTOR WHICH EXHIBITS GOOD REFLECTANCE OVER WIDE ANGLE RANGE AND LIQUID CRYSTAL DISPLAY USING THE SAME

(75) Inventors: Katsumasa Yoshii, Fukushima-ken (JP); Kenji Omote, Fukushima-ken (JP); Mitsuru Kano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/672,838

(22) Filed: Sep. 26, 2003

(65) Prior Publication Data

US 2004/0057137 A1 Mar. 25, 2004

Related U.S. Application Data

(62) Division of application No. 10/180,434, filed on Jun. 26, 2002, now Pat. No. 6,695,454.

(30) Foreign Application Priority Data

Jun. 28, 2001 (JP) ........................................ 2001-197359

(51) Int. Cl.$^7$ ................................................ G02B 5/10
(52) U.S. Cl. ........................ 359/858; 359/859; 359/850; 359/861
(58) Field of Search ................................ 359/858–861, 359/838–839, 868; 349/106, 113; 362/297–298, 516

(56) References Cited

U.S. PATENT DOCUMENTS

| 4,374,609 A | 2/1983 | Lange |
| 6,199,992 B1 | 3/2001 | Tanada |
| 6,219,120 B1 | 4/2001 | Sasaki et al. |

FOREIGN PATENT DOCUMENTS

| EP | 1174735 | 1/2002 |
| JP | 56-016119 | 2/1981 |
| JP | 03-144431 | 6/1991 |
| JP | 11-242105 | 9/1999 |

*Primary Examiner*—Mohammad Sikder
(74) *Attorney, Agent, or Firm*—Brinks Hofer Gilson & Lione

(57) ABSTRACT

Light-reflective concave portions are disposed on the surface of a substrate. The concave portions have a first and second vertical section perpendicular to each other. The first vertical section has an internal shape defined by a first curve and a second curve, the first curve extending from one point on the peripheral edge of the concave portion to the deepest point of the concave portion, and the second curve extending continuously from the first curve and from the deepest point of the concave portion to another point on the peripheral edge of the concave portion. The average of the absolute value of an inclination angle of the first curve is larger than that of the second curve relative to the substrate surface. The second vertical section has an internal shape defined by a shallow curve and deep curves formed at both sides of the shallow curve.

5 Claims, 7 Drawing Sheets

REFLECTOR WHICH EXHIBITS GOOD REFLECTANCE OVER WIDE ANGLE RANGE AND LIQUID CRYSTAL DISPLAY USING THE SAME

This application is a divisional application of U.S. application Ser. No. 10/180,434 filed on Jun. 26, 2002, now U.S. Pat. No. 6,695,454, entitled "Reflector Providing Particularly High Reflectance in an Intended Viewing Angle and Reflection Type Liquid Crystal Display Device Using the Same".

BACKGROUND OF THE INVENTION

1. Field of the Invention

The present invention relates to reflectors which are suitable for use in liquid crystal displays using external light, a front light, a backlight, etc., as a light source, and to liquid crystal displays using the reflectors. More specifically, the present invention relates to a reflector which exhibits good reflectance over a wide angle range and especially high reflectance in a reflection direction in a desired range, and to a liquid crystal display which uses the reflector so that it has a wide viewing angle and exhibits moderate directionality such that the display appears sufficiently bright when seen from a typical viewing area.

2. Description of the Related Art

Liquid crystal displays are commonly used as display units for mobile computers, etc., and reflective liquid crystal displays, which use external light as a light source, are one kind of liquid crystal displays which are commonly used because of their low power consumption. In addition, liquid crystal displays having a front light for obtaining extra light in addition to external light are also commonly used.

In such liquid crystal displays, external light incident on the display surface (from the observer side) or light emitted from a front light is reflected by a reflector and is emitted outside the display surface, so that a user can view an image which changes in accordance with the alignments of liquid crystal molecules in a liquid crystal layer.

In addition, liquid crystal displays having a backlight for obtaining extra light in addition to external light are also commonly used. In liquid crystal displays having a backlight, a semi-transmissive reflector is used in order to reflect external light and to pass light emitted from the backlight.

The inventors have performed various investigations with respect to the relationship between the shape of the surface of a reflector (the shape of the surface closer to a display surface) and reflection characteristics of the reflector.

When a reflector having a flat, specular surface is used, the reflector exhibits extremely high reflectance at a specific reflection angle determined in accordance with an incidence angle. However, a reflection-angle range in which high reflectance is obtained is extremely narrow. Thus, a reflector having high directionality such that a viewing area from which the reflector appears bright is narrow is obtained. In addition, visibility is degraded due to so-called back reflection, that is, reflection of a light source, an observer's face, etc. in a display surface.

Accordingly, several techniques have been suggested in which concave portions having shapes like parts of a sphere, grooves, or irregular concavities and convexities are formed over the surface of a reflector in order to obtain good reflectance over a wide range. According to these techniques, reflection characteristics can be made such that the reflector appears bright over a wide viewing area.

FIG. 9 shows a reflector in which a plurality of concave portions each shaped like a part of a sphere are formed on the surface of the reflector. With reference to FIG. 9, a reflector 51 is constructed by forming a plate-shaped resin base member 53 (a base member of the reflector) made of a photosensitive resin layer, etc., on a substrate 52 made of glass, etc., and forming a plurality of concave portions 54 over the surface of the resin base member 53. The inner surfaces of the concave portions 54 are shaped like a part of a sphere, and the concave portions 54 are formed continuously so that the concave portions 54 overlap one another. In addition, a reflective film 55 formed of a thin layer of aluminum, silver, etc. is formed on the concave portions 54 by vapor deposition, plating, etc.

The concave portions 54 are formed such that the depth thereof varies in the range of 0.1 $\mu$m to 3 $\mu$m, and are irregularly arranged such that the pitch between the concave portions 54 varies in the range of 5 to 50 $\mu$m. In addition, the inner surface of each concave portion 54 is shaped like a part of a single sphere, and an inclination angle thereof is set in the range of $-18°$ to $+18°$.

The term "depth of a concave portion" used herein means the distance between the substrate surface of a reflector and the deepest point of a concave portion, and the term "pitch between adjacent concave portions" used herein means the distance between the central points of adjacent concave portions, which have a circular shape as seen in a plan view. A surface as used herein is essentially a flat surface that disregards the minute irregularities (e.g. relatively microscopic crevasses or projections) present in almost every physical layer. Such a flat surface includes, for example, the substrate surface in which the concave portions are non-existent or are completely filled in.

In addition, "inclination angle" means an angle of a tangential line at an arbitrary point on the inner surface of the concave portions 54 relative to the substrate surface in a specific vertical section.

The reflector 51 has reflection characteristics similar to those of a comparative example (see FIG. 6), which will be described below. FIG. 6 is a graph showing the reflection characteristics in the case in which an incidence angle is 30°, where the vertical axis shows reflectance (reflection intensity) and the horizontal axis shows a reflection angle.

With reference to FIG. 10, an incidence angle is defined as an angle $\omega_0$ between the normal H of the reflector 51 (substrate surface) and incident light J. In addition, a reflection angle is defined as an angle $\omega$ between the normal H and reflection light K on a plane including the normal H and the incident light J. In addition, a specular reflection angle relative to the substrate surface is defined as an angle at which the incidence angle $\omega_0$ and the reflection angle $\omega$ are the same.

As shown in FIG. 6, for a specular reflection angle of 30°, the reflector 51 has a relatively good reflectance in the range of $15° \leq \omega \leq 45°$.

The above-described reflector 51 of the known art exhibits relatively good reflectance over a relatively wide angle range due to the concave portions. However, as shown FIG. 6, reflectance at 30°, which is the specular reflection angle, is relatively low compared with two peaks at 15° and 45°. Accordingly, reflection characteristics of the reflector 51 are such that although relatively good reflectance is ensured for a relatively wide range, brightness is reduced in the specular reflection angle.

However, when display units installed in devices such as notebook computers, desk calculators, watches, etc., are viewed, the direction of a light source (incidence angle) and a viewing angle of a user who receives reflection light (reflection angle) are normally in a specific range. Accordingly, it would be more convenient for the user to provide a display which not only appears bright in a wide area but also exhibits especially high reflection intensity in a specific direction.

In addition, in the case in which the above-described reflector, which appears bright over a wide viewing area, is used in liquid crystal displays having a backlight, a problem exists in that light emitted from the backlight is diffused too widely at the surface of the reflector and light emitted in the specular reflection angle, which is the angle at which a user normally views the display, is reduced.

SUMMARY OF THE INVENTION

In order to solve the above-described problems, an object of the present invention is to provide a reflector which exhibits good reflectance over a wide angle range and especially high reflectance in a reflection direction in a desired range, especially in a direction shifted from a direction of specular reflection, and which prevents light emitted from a backlight from being diffused too widely. In addition, it is also an object of the present invention to provide a reflective liquid crystal display which uses the reflector so that it appears bright over a wide viewing area and exhibits moderate directionality in a normal viewing area.

In order to solve the above-described problems, the present invention provides a reflector including a substrate having a plurality of light-reflective concave portions on the surface thereof, each concave portion having a first vertical section and a second vertical section which pass through a deepest point of the concave portion.

The first vertical section has an internal shape defined by a first curve and a second curve, the first curve extending from one point on the peripheral edge of the concave portion to the deepest point of the concave portion and the second curve extending continuously from the first curve from the deepest point of the concave portion to another point on the peripheral edge of the concave portion, and the average of the absolute value of an inclination angle of the first curve relative to the substrate surface is larger than the average of the absolute value of an inclination angle of the second curve relative to the substrate surface.

The second vertical section is perpendicular to the first vertical section and has an internal shape defined by a shallow curve and deep curves formed at both sides of the shallow curve, the deep curves having a smaller radius of curvature compared with the shallow curve.

Although the direction of the first vertical section is not determined, the vertical section along the up-down direction or the front-back direction relative to an observer is preferably defined as the first vertical direction.

As described above, in the reflector of the present invention, a plurality of light-reflective concave portions are formed on the substrate surface, and each of the concave portions has a curved surface (concave surface). Accordingly, the reflector appears bright from a wide viewing area and has a light-diffusing characteristic so that back reflection is suppressed.

The internal shape of each concave portion along the first vertical section is defined by the first curve and the second curve which are connected to each other at the deepest point. The first and the second curves are formed such that the average of the absolute value of the inclination angle of the first curve relative to the substrate surface is larger than the average of the absolute value of the inclination angle of the second curve relative to the substrate surface. More specifically, the inclination of the first curve is relatively steep and the inclination of the second curve is relatively gentle, and the second curve is longer than the first curve.

Accordingly, the amount of light reflected by the surface at regions around the second curve is larger than the amount of light reflected by the surface at regions around the first curve. More specifically, luminous flux density of reflection light in the direction of specular reflection relative to the surface at regions around the second curve is increased. Accordingly, when the first curves in each concave portion are aligned in a specific direction (or in a plurality of specific directions), reflectance in the specific direction(s) can be increased over the entire region of the reflector.

In addition, internal shape of each concave portion along the second vertical section, which is perpendicular to the first vertical section, is defined by the shallow curve and the deep curves formed at both sides of the shallow curve, the deep curves having a small radius of curvature. Accordingly, reflectance in the direction of specular reflection can be increased. Preferably, the deep curves are formed symmetrically across the shallow curve.

As a result, the overall reflection characteristics in the first vertical section are made such that peak reflectance is obtained at about the specular reflection angle and reflectance in the direction in which light is reflected by the surface at regions around the second curve B is increased. More specifically, reflection characteristics in which reflection light is moderately condensed in a specific direction without reducing the intensity of reflection light in the direction of specular reflection can be obtained.

According to the present invention, the concave portions are preferably formed such that the first vertical sections and the second vertical sections of each concave portion are aligned in the same direction and the orientations of the first curves in each concave portion are the same. More specifically, the orientations of the first curves in each concave portion are preferably made the same, and the orientations of the second curves in each concave portion are also preferably made the same.

In such a case, reflectance in the direction in which light is reflected by the surface at regions around the second curve B is increased over the entire region of the reflector. Accordingly, reflection characteristics in which reflection light is moderately condensed in a specific direction can be obtained.

In addition, according to the present invention, the inclination angle of the first curve relative to the substrate surface and the inclination angle of the second curve relative to the substrate surface are preferably substantially zero at the point at which the first curve and the second curve are connected to each other. In addition, preferably, when the inclination angle of the first curve is negative and the inclination angle of the second curve is positive, the inclination angle of the first curve is gradually increased from a negative value and the inclination angle of the second curve is gradually reduced from a positive value, and both the inclination angles of the first and second curves become substantially zero at the point at which the first and second curves are connected to each other.

Accordingly, the internal surfaces of each concave portion can be made smooth over the entire regions thereof, and reflectance in the direction of specular reflection can be prevented from being reduced.

Preferably, the concave portions are irregularly formed such that the depth thereof varies in the range of about 0.1 μm to 3 μm.

When the depths of the concave portions are less than about 0.1 μm, sufficient light-diffusing effect cannot be obtained. When the depths of the concave portions exceed about 3 μm, the thickness of the substrate, which must be larger than the depths of the concave portions, becomes too large and leads to problems in the manufacturing process and deterioration in product quality. Further, because a moiré pattern occurs due to light interference when the concave portions are formed regularly, by forming the concave portions with various depths the emergence of a moiré pattern is avoided. In addition, the reflection light is prevented from converging too sharply at a predetermined viewing angle and the amount of reflection light varies smoothly in the viewing area.

Preferably, the concave portions are irregularly arranged next to each other.

When the concave portions are formed separately, regions at which specular reflection occurs are increased since the regions between the concave portions are flat, and sufficient light-diffusing effect cannot be obtained in the limited pixel area. Accordingly, the concave portions are preferably formed next to each other. In addition, the concave portions are preferably formed irregularly since the moiré pattern appears when the concave portions are formed regularly.

The present invention also provides a reflective liquid crystal display which includes one of the above-described reflectors. Preferably, the concave portions are formed such that the first vertical sections and the second vertical sections of each concave portion are aligned in the same direction and the orientations of the first curves in each concave portion are the same, and the reflector is installed such that the first curves are disposed above the second curves in each concave portion when viewed by an observer.

When the first curves are disposed above the second curves in each concave portion when viewed by the observer, external light, which is mainly incident from the upper side, can be reflected in a direction shifted toward the normal of the substrate surface from the lower side of the observer.

In addition, since external light, which is mainly incident from the upper side of the observer, is efficiently received at regions around the second curves, the amount of reflection light is increased over the entire region.

In addition, the amount of light reflected in the direction of specular reflection can be increased due to the reflection at the shallow curve in the second vertical section.

Accordingly, the amount of light reflected toward the eyes of the observer is increased, and a reflective liquid crystal display which appears bright from the viewpoint of the observer can be obtained.

The present invention also provides a reflector in which peak reflectance is obtained at about the specular reflection angle and an integrated value of reflectance in a reflection-angle range smaller than a specular reflection angle with respect to the substrate surface is different from an integrated value of reflectance in a reflection-angle range larger than the specular reflection angle.

Accordingly, when a normal viewing angle of the observer is displaced from the direction of specular reflection relative to the substrate surface, a reflector in which light is mainly reflected in the direction of the normal viewing angle without reducing the amount of reflection light in the direction of specular reflection can be obtained.

The present invention also provides a reflective liquid crystal display which includes a reflector in which peak reflectance is obtained at about a specular reflection angle and an integrated value of reflectance in a reflection-angle range smaller than a specular reflection angle with respect to the substrate surface is different from an integrated value of reflectance in a reflection-angle range larger than the specular reflection angle. The reflector is installed such that the reflection-angle range corresponding to the larger of the integrated values of reflectance is disposed at the upper side of the specular reflection angle with respect to the substrate surface when viewed by an observer.

According to the present invention, external light, which is mainly incident from the upper side, can be reflected in the direction shifted toward the normal of the substrate surface from the lower side of the observer.

Accordingly, when the reflective liquid crystal display of the present invention is used as a display for a mobile phone or a notebook computer, the amount of light reflected toward the eyes of the observer is increased, and a reflective liquid crystal display which appears bright from the viewpoint of the observer can be obtained.

As described above, according to the present invention, a reflector can be obtained which has a light-diffusing characteristic so that incident light is diffusely reflected and back reflection is suppressed over a wide viewing angle, and in which the amount of reflection light in the viewing-angle range in which the observer normally views the display is increased.

In addition, in a reflective liquid crystal-display containing the reflector of the present invention, display surface appears especially bright when viewed in a specific viewing-angle range so that visibility is improved, and back reflection is suppressed over a wide viewing-angle range.

DESCRIPTION OF THE PREFERRED EMBODIMENT

An embodiment of the present invention will be described below with reference to the accompanying drawings; however, it is not intended to limit the scope of the present invention.

Figure 1:
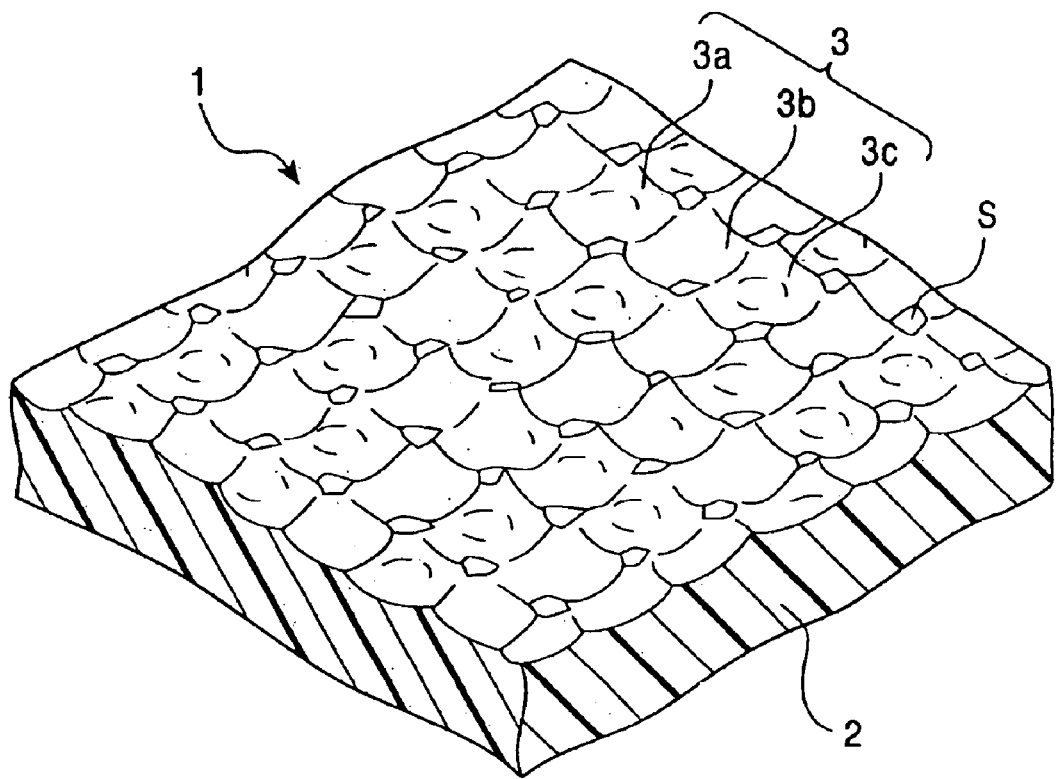
FIG. 1 is a perspective view of a reflector according to an embodiment of the present invention.

FIG. 1 is a diagram showing a reflector 1 according to an embodiment of the present invention. As shown in FIG. 1, the reflector 1 of the present embodiment is constructed of a plate-shaped substrate 2 formed of, for example, aluminum. A plurality of light-reflective concave portions 3a, 3b, 3c, . . . , (denoted as concave portions 3 when they are generically described) are irregularly formed next to each other on the surface S (standard surface) of the substrate 2.

Figure 2:
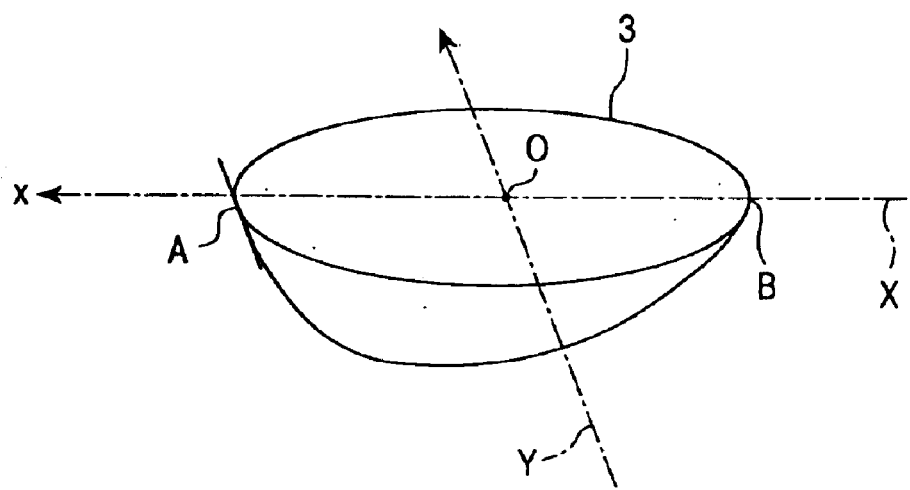
FIG. 2 is a perspective view of a concave portion according to the embodiment.
Figure 3:
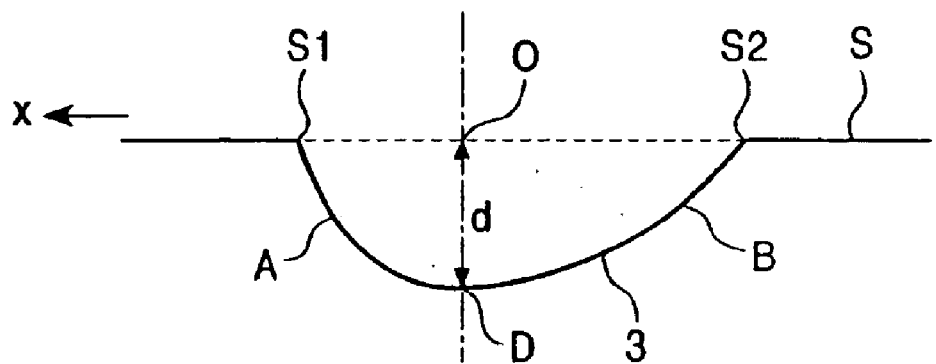
FIG. 3 is a sectional view of the concave portion along a first vertical section.
Figure 4:
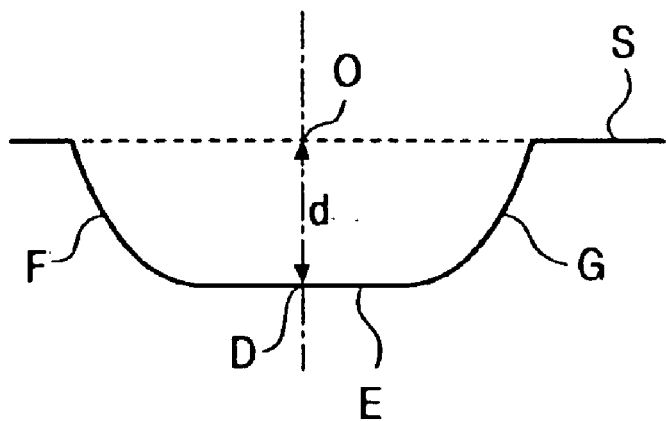
FIG. 4 is a sectional view of the concave portion along a second vertical section.

The internal shape of the concave portion 3 is shown in FIGS. 2 to 4. FIG. 2 is a perspective view of the concave portion 3, FIG. 3 is a sectional view of the concave portion 3 cut along a first vertical section X, and FIG. 4 is a sectional view of the concave portion 3 cut along a second vertical section Y, which is perpendicular to the first vertical section X.

As shown in FIG. 3, the internal shape of the concave portion 3 along the first vertical section X is defined by a first curve A and a second curve B, the first curve A extending from one point S1 on the peripheral edge to the deepest point D, and the second curve B extending continuously from the first curve A from the deepest point D to the other point S2 on the peripheral edge. With reference to FIG. 3, the first curve A extends downward toward the right, and the second curve B extends upward toward the right. In addition, both an inclination angle of the first curve A relative to the substrate surface S and an inclination angle of the second curve B relative to the substrate surface S are substantially zero at the deepest point D, where the first curve A and the second curve B are smoothly connected to each other.

The inclination angle of the first curve A relative to the substrate surface S is steeper than the inclination angle of the second curve B, and the deepest point D is at a position shifted toward the x direction from the central point O of the concave portion 3 (i.e. the deepest point D and the central point O of the concave portion are not vertically aligned). More specifically, the average of the absolute value of the inclination angle of the first curve A relative to the substrate surface S is larger than the average of the absolute value of the inclination angle of the second curve B relative to the substrate surface S. The average of the absolute value of the inclination angle of the first curve A relative to the substrate surface S in the concave portions 3a, 3b, 3c, . . . , varies in the range of about 2° to 90°. In addition, the average of the absolute value of the inclination angle of the second curve B relative to the substrate surface S in the concave portions 3a, 3b, 3c, . . . , varies in the range of about 1° to 89°.

In addition, as shown in FIG. 4, the internal shape of the concave portion 3 along the second vertical section Y is approximately symmetrical about the vertical line passing through the central point O of the concave portion 3. The region around the deepest point D is defined by an almost linear, shallow curve E having a large radius of curvature, and regions at the right and left sides of the shallow curve E are defined by deep curves F and G having a small radius of curvature. In each of the concave portions 3a, 3b, 3c, . . . , the absolute value of an inclination angle of the shallow curve E relative to the substrate surface S is generally about 10° or less. In addition, the absolute values of inclination angles of the deep curves F and G relative to the substrate surface S in the concave portions 3a, 3b, 3c, . . . , vary in the range of, for example, about 2° to 90°. Note that although the term "each of the concave portions" is used in multiple places throughout the detailed description, a substantial majority of the concave portions may be used as well as every concave portion. As long as the effects described herein are achieved, the absolute percentage of concave portions which are, for example, oriented in exactly the same direction is inconsequential.

In addition, the distance between the deepest point D and the substrate surface S is defined as the depth of each concave portion 3, and the depth of the concave portions 3a, 3b, 3c, . . . , varies in the range of about 0.1 $\mu$m to 3 $\mu$m.

In the present embodiment, the first vertical sections X of each of the concave portions 3a, 3b, 3c, . . . , are aligned in the same direction. Similarly, the second vertical sections Y of each of the concave portions 3a, 3b, 3c, . . . , are aligned in the same direction. In addition, the orientations of the first curves A in each of the concave portions 3a, 3b, 3c, . . . , are the same. More specifically, in every concave portion, the x axis shown in FIGS. 2 and 3 extends in the same direction.

In the reflector 1 of the present embodiment, the orientations of the first curves A in each of the concave portions 3a, 3b, 3c, . . . , are the same. Accordingly, as shown in FIG. 5, the reflection characteristics of the reflector 1 are such that the reflection direction is shifted from the direction of specular reflection relative to the substrate surface S.

Figure 5:
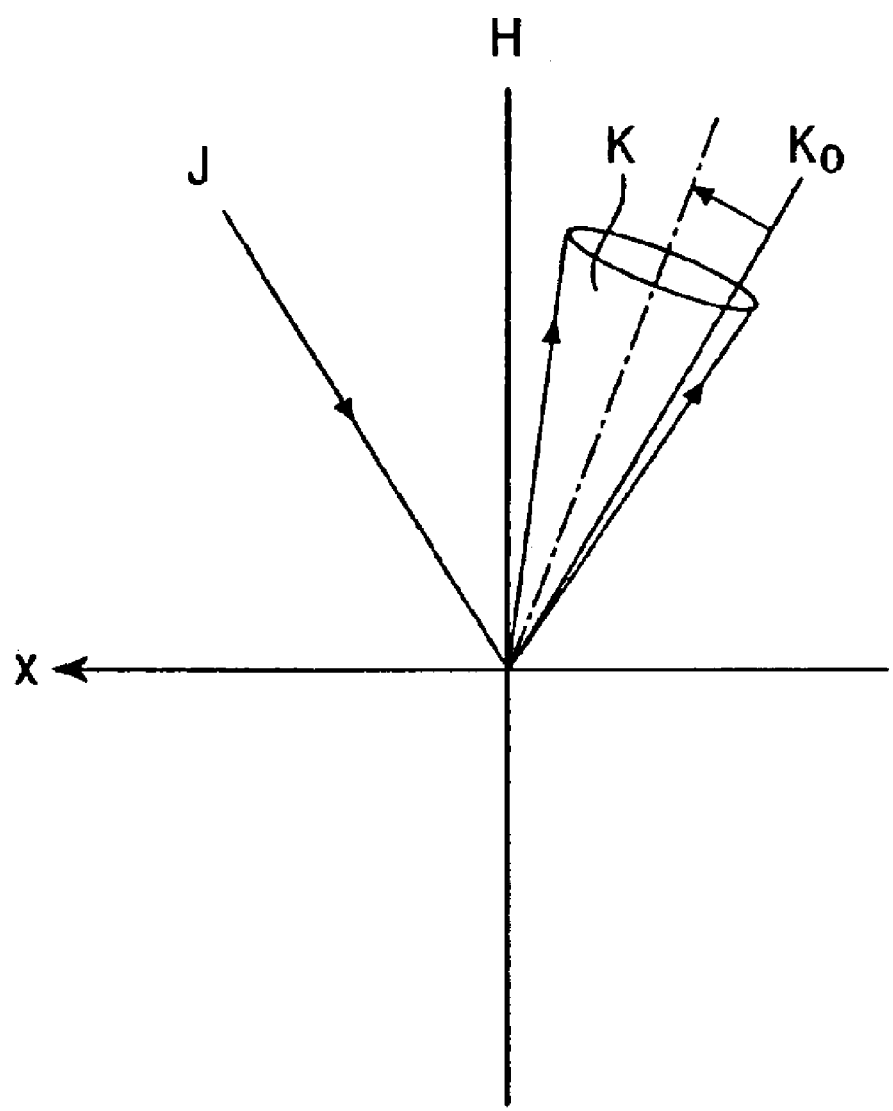
FIG. 5 is a diagram showing the reflection characteristics of a reflector according to the embodiment.

More specifically, as shown in FIG. 5, the reflection light K corresponding to incident light J, which is incident at an angle from the upper side of the x direction, is shifted such that a viewing area from which the display appears bright is shifted from the direction of specular reflection $K_0$ toward the normal H relative to the substrate surface S. The angles formed by the incident light J and specular reflection $K_0$ are symmetric around the normal H of the substrate surface S.

In addition, as described above, the internal shape of each concave portion 3 along the second vertical section Y, which is perpendicular to the first vertical section X, is defined by the shallow curve E having a large radius of curvature and the deep curves F and G having a small radius of curvature. Accordingly, reflectance in the direction of specular reflection relative to the substrate surface can be increased.

Figure 6:
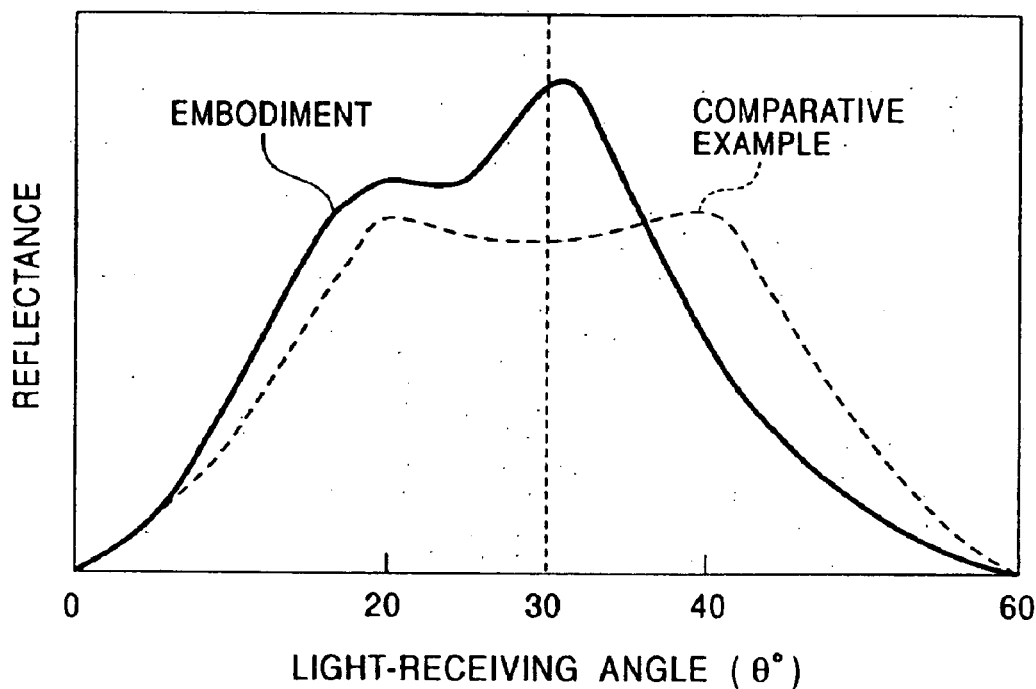
FIG. 6 is a graph showing the relationship between a light-receiving angle and reflectance.

As a result, as shown in FIG. 6, the overall reflection characteristics in the first vertical section X are made such that peak reflectance is obtained at about the specular reflection angle and reflectance in the direction in which light is reflected by the surface at regions around the second curve B is increased. More specifically, reflection characteristics in which reflection light is moderately condensed in a specific direction without reducing the amount of reflection light in the direction of specular reflection can be obtained.

More specifically, FIG. 6 shows the relationship between the light-receiving angle ($\theta$°) of a viewer and brightness (reflectance) in the case in which external light is radiated onto the display surface of the reflector 1 of the present embodiment under a condition in which the incidence angle is 30°. The light-receiving angle is changed from 0° (angle corresponding to the normal) to 60° across the midpoint 30°, which is the specular reflection angle relative to the display surface (substrate surface). As a comparative example, the relationship between the light-receiving angle and the reflectance in a reflective liquid crystal display containing a known reflector having spherical concave portions is also shown in FIG. 6.

As is apparent from FIG. 6, in the comparative example, the reflectance is approximately constant when the light-receiving angle is in the range of 15° to 45° (although there is somewhat of a decrease in emission at the specular angle). In contrast, with respect to the reflector 1 of the present embodiment, peak reflectance is obtained at about 30°, that is, about the specular reflection angle relative to the substrate surface S. In addition, the integrated value of the reflectance in the range in which the light-receiving angle is smaller than the specular reflection angle (30°) is larger than the integrated value of the reflectance in the range in which the light-receiving is larger than the specular reflection angle. More specifically, sufficient brightness can be obtained at viewing angles around 20° while ensuring brightness in the direction of specular reflection. The reason for this is that most users typically view the display (for example, in computers, cellular telephones, watches, PDAs) at angles of about normal to the surface to about the specular reflection angle (or here a little larger—about 35° from normal), with angles around 20° being especially popular. Thus, the liquid crystal display should have increased brightness relative to a conventional liquid crystal display at least from about normal to the surface to about the specular reflection angle.

Although the manufacturing method for the reflector 1 is not limited, the reflector 1 can be manufactured by, for example, the following processes.

First, a punch (stamping tool) having a convex end portion corresponding to the shape of the above-described convex portions is prepared. The punch is held such that the end portion thereof opposes an aluminum substrate, and is repeatedly pressed against the aluminum substrate so as to form the convex portions over the entire area of a predetermined region of the aluminum substrate. While the punch is repeatedly pressed against the aluminum substrate, the orientation of the punch relative to the aluminum substrate is maintained constant and the stroke and interval are changed irregularly. The stroke is adjusted such that the depth of the concave portion is in a predetermined range, and the interval is adjusted such that a moiré pattern does not appear.

Of course, the reflector 1, is shown as formed from a single reflective material. In another embodiment, the reflector 1 may comprise a base portion onto which the concave portions were formed and a reflective layer disposed on the base layer. The base portion may be formed in a manner similar to that of the reflector 1, above, while the reflective layer may be formed by deposition, sputtering, evaporation or any other suitable method. The base portion may be any material suitable for forming the concave portions, organic or inorganic (for example glass), while the reflective layer may be, for example, a thin metallic layer. Alternately, the base portion may be the substrate itself.

Figure 7:
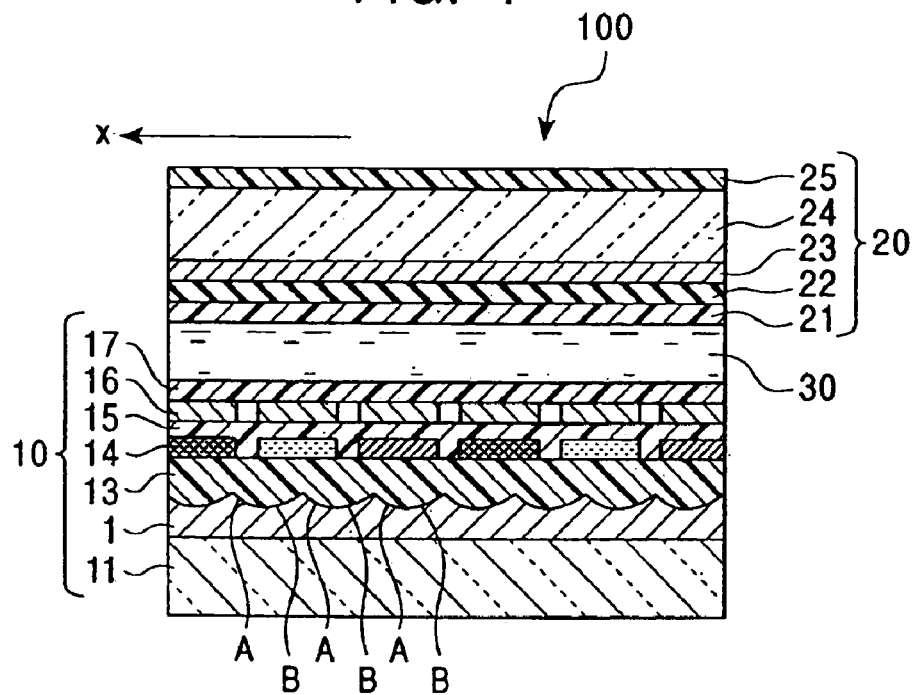
FIG. 7 is a sectional view showing the layer structure of the reflective liquid crystal display according to the embodiment.

FIG. 7 is a sectional view showing the layer structure of a reflective liquid crystal display 100 containing the reflector 1 of the present embodiment.

With reference to FIG. 7, in the reflective liquid crystal display 100, a display-side substrate 20 and a reflector-side substrate 10 oppose each other with a liquid crystal layer 30 therebetween. The display-side substrate 20 is transmissive and the reflector-side substrate 10 is reflective. The external surface of the display-side substrate 20 serves as a display surface, and the reflector-side substrate 10 is provided with the reflector 1.

The reflector-side substrate 10 is formed by laminating a glass substrate 11, the reflector 1, a transparent intervening layer 13, a color-filter layer 14, a transparent planarizing layer 15, a transparent electrode layer 16 formed of an Indium Tin Oxide (ITO) film, a Nesa film, etc., and an alignment layer 17, in that order from the bottom. In addition, the display-side substrate 20, which opposes the reflector-side substrate 10 across the liquid crystal layer 30, is formed by laminating an alignment layer 21, an insulating layer 22, a transparent electrode layer 23 formed of an ITO film, a Nesa film, etc., a glass substrate 24, and a light-modulating layer 25 (a polarizing plate, a retardation plate, etc.) in that order from the liquid crystal layer 30.

Transparent electrodes of the transparent electrode layer 16 and transparent electrodes of the transparent electrode layer 23 are arranged in striped patterns which perpendicularly cross each other, the liquid crystal layer 30 being disposed therebetween. Thus, a simple-matrix liquid crystal device is formed in which pixels are formed at intersections of the transparent electrodes of the transparent electrode layer 16 and the transparent electrodes of the electrode layer 23.

Of course, the transparent electrodes may be formed in other patterns and provided at different locations in the liquid crystal display 100, as can the color filters in the color-filter layer 14. For example, the color filters may be provided in the display-side substrate 20 rather than the reflector-side substrate 10, being formed on the substrate 24 and having another insulating layer disposed the transparent electrode layer 23 and the color filter for instance. Examples of possible arrangements of the color filters include a stripe-type arrangement having different colors arranged successively side by side, a delta-type arrangement having colors arranged in a triangular shape, and a mosaic-type arrangement having arranged successively side by side in a vertical direction and a horizontal direction. In addition, the color filters may comprise different colors (red, blue, green, cyan, magenta, yellow or achromatic to name a few).

In the reflective liquid crystal display 100, the reflector 1 is aligned such that the first curves A in the concave portions 3a, 3b, 3c, . . . , are placed in the x direction relative to the second curves B, which have gentler slopes. In addition, characters, etc., are displayed in the orientation such that the x direction is aligned with the upward direction.

Figure 8:
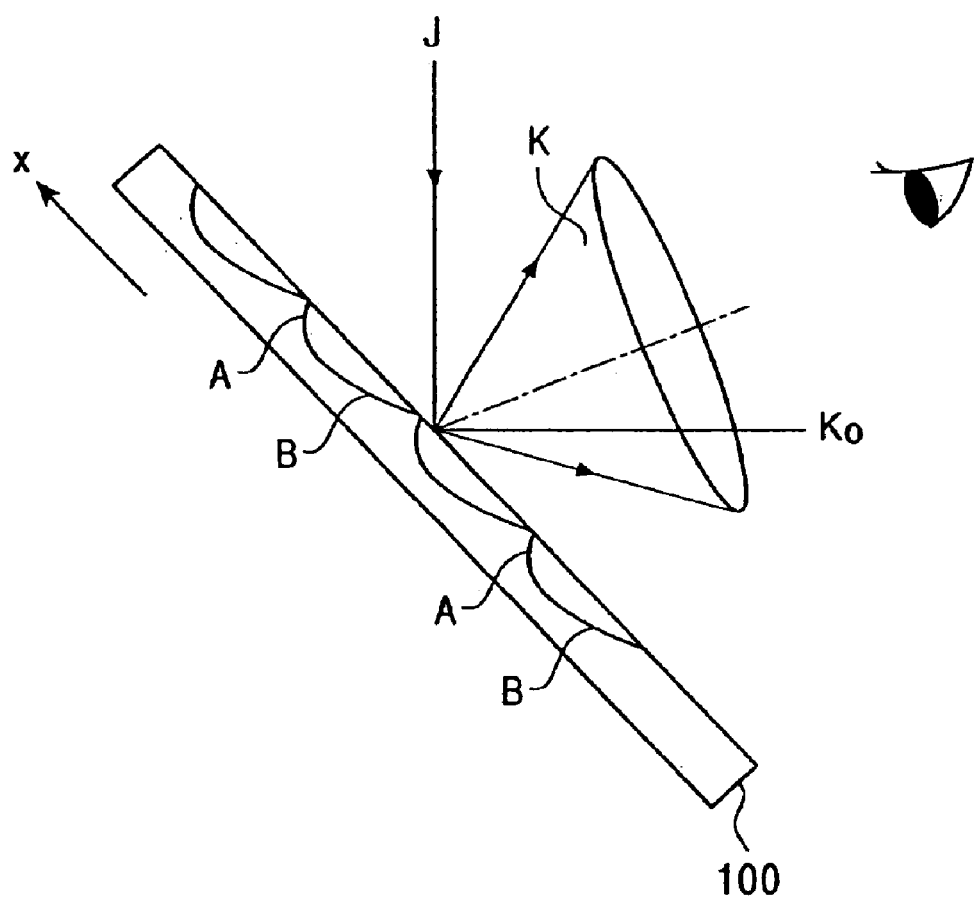
FIG. 8 is a diagram showing a manner in which the reflective liquid crystal display according to the embodiment is used.
Figure 9:
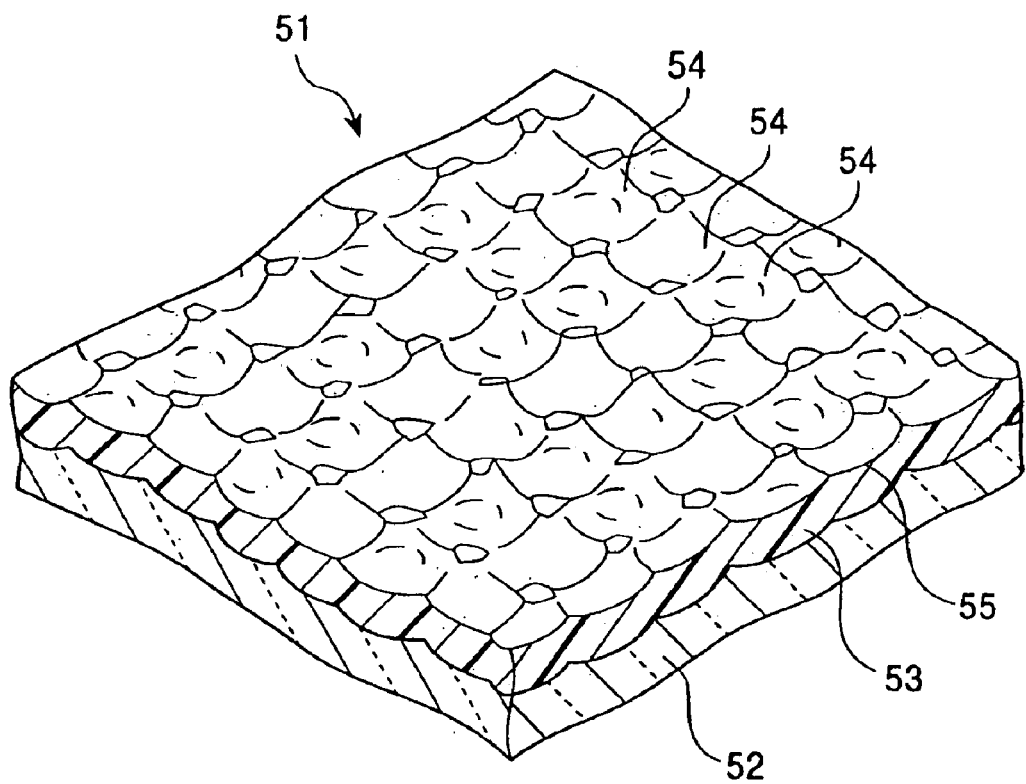
FIG. 9 is a perspective view showing a reflector of the known art.
Figure 10:
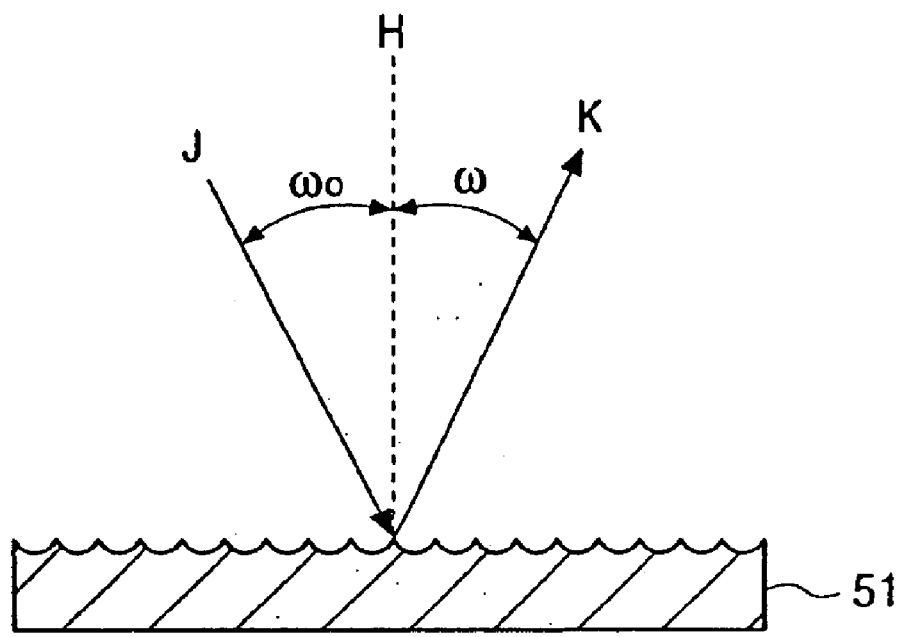
FIG. 10 is a diagram showing an incidence angle and a reflection angle.

FIG. 8 is a diagram showing the manner in which the reflective liquid crystal display 100 is used. In FIG. 8, only the first curves A and the second curves B in the reflective liquid crystal display 100 are shown and other components are omitted for convenience.

The reflective liquid crystal display 100 is installed in a mobile phone, a notebook computer, personal data assistant, etc., in the orientation such that the x direction is aligned with the upward direction. In such a case, as shown in FIG. 8, the reflective liquid crystal display 100 is normally set or held at an angle relative to the horizontal plane such that the x direction is aligned with the upward direction. More specifically, when the reflective liquid crystal display 100 is used, it is disposed such that the first curves A are above the second curves B in each concave portion when viewed by the observer. In addition, the observer normally looks down onto the reflective liquid crystal display 100 from the upper side relative to the direction of specular reflection $K_0$ and from the lower side relative to the horizontal plane.

In such a case, external light (incident light J), which is primarily incident from the upper side, is mainly reflected by the surface at regions around the second curves B, so that reflection light K is not easily directed toward the lower side of the observer but rather heads essentially toward the upper side relative to the direction of specular reflection $K_0$.

Accordingly, the viewing area from which the observer normally views the display and the viewing area from which the display appears bright are made the same. Therefore, a display which appears bright from the viewpoint of the observer can be obtained.

Although the reflective liquid crystal display according to the present embodiment shown in FIG. 7 is constructed such that the reflector 1 and the transparent electrode layer 16 are formed separately, the transparent electrode layer 16 may also be formed of the reflector 1 and placed at the position where the reflector 1 is formed in FIG. 7. In such a case, the transparent electrode layer also serves as a reflector, and the layer structure of the reflective liquid crystal display can be made simpler.

In addition, the above-described reflector may be formed of a semi-transmissive, semi-reflective substrate such as a half mirror, etc., and an illumination plate may be disposed behind the liquid crystal panel. In such a case, a semi-transmissive, semi-reflective liquid crystal display can be obtained which serves as a reflective type when external light is bright and serves as a transmissive type by illuminating the illumination substrate when external light is dark. For this, the liquid crystal display may also include a light source disposed under or to one side of the display and additionally include a light guide to guide the light from the light source to at least the area under the reflector and display. The present invention may also be applied to such semi-transmissive, semi-reflective liquid crystal displays.

In addition, when a front light is disposed in front of the display-side substrate 20, a front-light liquid crystal display can be obtained in which external light is exclusively used when the external light is bright and the front light is optionally used when the external light is dark. The present invention may also be applied to such front-light liquid crystal displays.

The liquid-crystal driving method is not limited in the present invention, and the present invention may also be applied to active-matrix liquid crystal displays using thin film transistors and thin film diodes, segmented liquid crystal displays, etc., in addition to the above-described simple-matrix liquid crystal display.

What is claimed is:

1. A reflector in which peak reflectance is obtained at about a specular reflection angle and a first integrated value of reflectance in a reflection-angle range smaller than the specular reflection angle with respect to a substrate surface is different from a second integrated value of reflectance in a reflection-angle range larger than the specular reflection angle.

2. A reflective liquid crystal display comprising a reflector according to claim 1, wherein the reflector is installed such that the reflection-angle range corresponding to the larger of the integrated values of reflectance is disposed at an upper side of the specular reflection angle with respect to the substrate surface when viewed by an observer.

3. A reflector according to claim 1, wherein a secondary peak in reflectance is formed in the reflection-angle range smaller than the specular reflection angle.

4. A reflector according to claim 3, wherein the secondary peak is disposed at an angle between normal to the substrate surface and about 20° from normal to the substrate surface.

5. A reflector according to claim 1, wherein the first integrated value of reflectance is larger than the second integrated value of reflectance.

* * * * *